(12) United States Patent
Malavasi et al.

(10) Patent No.: US 10,393,375 B2
(45) Date of Patent: Aug. 27, 2019

(54) PRESSURIZED OXYCOMBUSTION PROCESS

(71) Applicant: ITEA S.p.A., Milan (IT)

(72) Inventors: Massimo Malavasi, Milan (IT); Grazia Di Salvia, Bari (IT)

(73) Assignee: ITEA S.P.A., Milan (IT)

( * ) Notice: Subject to any disclaimer, the term of this patent is extended or adjusted under 35 U.S.C. 154(b) by 326 days.

(21) Appl. No.: 15/103,754

(22) PCT Filed: Dec. 12, 2014

(86) PCT No.: PCT/EP2014/077543
§ 371 (c)(1),
(2) Date: Jun. 10, 2016

(87) PCT Pub. No.: WO2015/097001
PCT Pub. Date: Jul. 2, 2015

(65) Prior Publication Data
US 2016/0320056 A1    Nov. 3, 2016

(30) Foreign Application Priority Data

Dec. 27, 2013 (IT) .......................... BA2013A000084

(51) Int. Cl.
*F23J 7/00* (2006.01)
*F23L 7/00* (2006.01)
(Continued)

(52) U.S. Cl.
CPC ................. *F23J 7/00* (2013.01); *C10L 1/326* (2013.01); *C10L 10/00* (2013.01); *C10L 10/02* (2013.01);
(Continued)

(58) Field of Classification Search
CPC ..... F23J 7/00; F23C 9/00; F23C 2900/99001; F23D 1/005; F23G 2201/701;
(Continued)

(56) References Cited

U.S. PATENT DOCUMENTS 4,502,227 A * 3/1985 Janusch ................... C10L 9/00
                                                        201/41
4,760,650 A * 8/1988 Theliander ............... B01J 6/004
                                                        110/224
(Continued)

FOREIGN PATENT DOCUMENTS

CA       2935051 A1 *  7/2015  ................. F23J 7/00
EP       1 616 129 A1    1/2006
(Continued)

OTHER PUBLICATIONS

International Search Report issued in PCT/EP2014/077543 dated Sep. 21, 2015.
(Continued)

*Primary Examiner* — Stephen M Gravini
(74) *Attorney, Agent, or Firm* — Arent Fox LLP (57) ABSTRACT

Oxycombustion process wherein a combustor is fed with a fuel, a comburent and compounds under the form of coherent aggregates having Young modulus $\geq 10^4$ MPa, the combustor being isothermal and flameless.

19 Claims, 5 Drawing Sheets

(51) Int. Cl.
*F23C 9/00* (2006.01)
*F23D 1/00* (2006.01)
*C10L 1/32* (2006.01)
*C10L 10/02* (2006.01)
*C10L 10/00* (2006.01)

(52) U.S. Cl.
CPC ............... *F23C 9/00* (2013.01); *F23D 1/005* (2013.01); *F23L 7/007* (2013.01); *C10L 2290/02* (2013.01); *C10L 2290/10* (2013.01); *C10L 2290/141* (2013.01); *C10L 2290/143* (2013.01); *C10L 2290/60* (2013.01); *F23C 2900/99001* (2013.01); *F23G 2201/701* (2013.01); *F23G 2202/30* (2013.01); *F23K 2201/505* (2013.01); *Y02E 20/342* (2013.01); *Y02E 20/344* (2013.01)

(58) Field of Classification Search
CPC .......... F23G 2202/30; F23K 2201/505; Y02E 20/342; Y02E 20/344; C10L 2290/02; C10L 2290/10; C10L 2290/141; C10L 2290/143; C10L 2290/60
USPC ...................................... 34/90, 381; 110/435
See application file for complete search history.

(56) References Cited

U.S. PATENT DOCUMENTS

| | | | | |
|---|---|---|---|---|
| 5,335,425 A * | 8/1994 | Tomizawa | ............... | F26B 3/347 34/265 |
| 5,428,906 A * | 7/1995 | Lynam | .................... | C02F 11/14 34/379 |
| 5,765,293 A * | 6/1998 | St. Louis | .................. | F26B 1/00 210/667 |
| 6,321,462 B1 * | 11/2001 | Seidl | ......................... | F23C 9/06 34/423 |
| 7,987,613 B2 * | 8/2011 | Ness | .......................... | C10L 9/08 110/249 |
| 8,453,583 B2 | 6/2013 | Malavasi et al. | | |
| 2010/0248168 A1 * | 9/2010 | Malavasi | ................... | C10L 1/10 431/2 |
| 2010/0261126 A1 * | 10/2010 | Malavasi | .................. | C10L 1/12 431/4 |
| 2015/0153043 A1 * | 6/2015 | Malavasi | .............. | C10L 1/1216 252/372 |
| 2015/0184853 A1 * | 7/2015 | Malavasi | .............. | C10L 1/1216 252/71 |
| 2016/0045841 A1 * | 2/2016 | Kaplan | ................ | B01J 19/0093 429/49 |
| 2016/0320056 A1 * | 11/2016 | Malavasi | ................... | F23J 7/00 |

FOREIGN PATENT DOCUMENTS

| | | | | |
|---|---|---|---|---|
| EP | 2 220 198 A1 | 8/2010 | | |
| EP | 3087316 A2 * | 11/2016 | ................ | F23J 7/00 |
| WO | WO 2004/094904 A1 | 11/2004 | | |
| WO | WO 2009/071230 A1 | 6/2009 | | |
| WO | WO 2009/071238 A1 | 6/2009 | | |
| WO | WO 2009/071239 A1 | 6/2009 | | |
| WO | WO 2010/084318 A2 | 7/2010 | | |
| WO | WO 2015097001 A2 * | 7/2015 | ................ | F23J 7/00 |
| WO | WO 2015097001 A3 * | 11/2015 | ................ | F23J 7/00 |

OTHER PUBLICATIONS

Italian Search Report issued in Italian Patent Application No. BA20130084 dated Sep. 18, 2014.
Aerosols Chapter 5, Fig. 5.18, pp. 354.
EPA (Environmental Protection Agency), Mar. 2012, (ref: EPA-450/ S-12-001; on line: http://www.epa.gov/blackcarbon).
Klika et al, "Critical Evaluation of Mineral Contents in Coal Using Chemical Quantitative Phase Analysis Method," Pittsburg Coal Conference, Sep. 2013, Proceedings, pp. 1-9.

* cited by examiner

PRESSURIZED OXYCOMBUSTION PROCESS

CROSS-REFERENCE TO RELATED APPLICATIONS

This application is a National Stage entry of International Application No. PCT/EP2014/077543, filed Dec. 12, 2014, which claims priority to Italian Patent Application No. BA2013A000084, filed Dec. 27, 2013. The disclosure of the prior applications are hereby incorporated in their entirety by reference.

SUMMARY

The present invention relates to a combustion process allowing to obtain a substantial elimination of the organic particulate from flue gases combined with a still more significant drastic reduction of the integral of the numeral distribution of the inorganic particle having size or diameter lower than one micrometer, up to achieve a value of the integral of the inorganic particle size numeral distribution almost of the same order of that of the integral of the numeral distribution of the inorganic particle size of the natural background.

More specifically the present invention relates to a combustion process allowing to obtain the substantial elimination of the organic particulate from flue gases combined with a significant reduction of the integral of the numeral distribution of the inorganic particle sizes below 0.1 micrometer, being the concentrations by weight of the part of inorganic ashes with particle size lower than 1 μm very low, lower than 0.01 mg/Nm$^3$ flue gas dry basis.

Still more in particular the present invention allows to obtain values of the integral of the numeral distribution of the inorganic particles having a diameter lower than 1 μm lower than 650,000, preferably lower than 300,000 and still more preferably lower than 200,000 (1/cm$^3$ or number of particle/cm' flue gas;
of the inorganic particles having a diameter lower than 0.1 μm lower than 400,000, more preferably lower than 200,000, still more preferably lower than 120,000;
the value of the integral of the numeral distribution determined with the impactor ELPI® (Dekati®) by analyzing flue gases obtainable by using a 3 MW isothermal and flameless combustor, described later on, operating at a pressure of 13 absolute bar (12 relative bar or barg) at the temperature of 1430° C., by feeding coal as fuel and oxygen 90% by volume as comburent, being present oxygen at a concentration 3% by volume in the fumes outletting the combustor, coal being fed as a 35% by weight slurry in water, oxygen being fed in admixture with recycling fumes containing 55% by volume of steam.

BACKGROUND

It is known in the prior art that combustion of any type of fuel produces particulate or powders, this means solid particles containing both incombusted/partially combusted organic substances (BC-black carbon, soot; or OC-organic carbon), and inorganic substances such as salts and metal oxides, among which heavy metals, as Ni, V, Se, Cr, etc.).

As regards the impact of powders on human health, it is worthwhile stressing that clear epidemiological data until recently were not available. However general worries deriving from human physiology knowledge in particular were concerned and a more marked effect of the emitted particulate was expected, from particles having a lower diameter for example below 1 down to 10 manometer. It was in fact kept, qualitatively, that the specific danger given by the of submicron particle was higher owing to their inherent capability to come into strict and permanent contact with the human tissues (e.g.: lung alveoli) contiguous and permeable to the blood circulation system (FIGS. 5.18, page 354, Aerosols Chapter 5). In other words, it was believed that the smaller the solid particle, the higher the danger, in addition of the inherent dangerousness of the type of the emitted substance released in the flue gases of the combustor.

As regards to the environmental aspect, fume powders have been taken into consideration for their potential effect both on the earth warming and on air and earth pollution when related to dangerous suspected substances.

Concerns on the potential effects on human health gave rise to several toxicological and environmental studies, in exponential growth in the last decade. However the epidemiological studies in progress have not influenced the regulations in force on fume emissions for that it relates to the limit of the total allowed number of submicron particles. Likewise any distinction as to their intrinsic dangerousness is still absent, the present regulations being still and only based on the consolidated knowledge of the harmful effects of the emitted substances. For example, the rule still maintains emission limits expressed as total weight (indistinct) of the emitted PM 10 particulate (acronym indicating the particulate having <10 μm size), and in detail, for the most strict regulations, values <10 mg/Nm$^3$ of emitted fumes, dry basis. Both the characterization methodologies and the values obtained therefrom, do not seem to take into account the evaluation of the danger.

The use of the PM 2.5 indicator (total particles having a diameter <2.5 micrometer), representative of the greatest importance to be attributed to the portion of the smaller particles inside the total particulate, has found only a theoretical application in several toxicological studies and no relevance in national regulations.

But recently, more and more numerous and reliable toxicological data, made available by the literature of the field, have allowed to draw clear conclusions on the dangerousness of the particulate and on the greatest impact of the smallest particles (greater epidemiological significance of the indicator PM 2.5), and above all on the significant correlation between the impact on human health and emissions both of BC and OC, and heavy metals as nickel, vanadium, selenium, lead in the order.

At the recent PCC conference of Pittsburgh (Pittsburgh Coal Conference) of 2012 a final study of DOE (US Energy Department) outlines clear cause-effect correlations, with a shocking indicator: 2.5 years of reduction in life expectation. The study has an emblematic title: Why did it take so long to find out?. This study reflects voluminous report presented by EPA (Environmental Protection Agency) at the Congress of the United States, in March 2012 (ref.: EPA-450/S-12-001; on line: http://www.epa.gov/blackcarbon).

The problem potentially concerns all the uses of fuels, from autotraction to power stations, to home heating with biomasses, etc.

Certainly this will give rise to more and more specific regulations in the time, much diluted in the time, because of non-availability of technological solutions at present. As a matter of fact the submicron particulate is outside the "technology limit" of the available industrial technologies, i.e. it escapes the known industrial techniques of flue gases post-treatment that are effective above 1 μm particle size. Even a series of more unit operations on flue gases, such as for example filtration with sleeve filters followed by electrostatic filtration and by wet electrostatic filtration, are effective (efficiency >80%) only above 1 μm particle size. Very strict cleanings of combustion fumes can take place therefore with low unit efficiencies and consequently with very significant costs and complexity.

Likewise and in parallel, the activities of development of power production technologies without release of greenhouse gas (that is, including the $CO_2$ capture) conflict with the technological problem of the influence of the particulate, residual in flue gases after post-treatments, on the efficiency of the $CO_2$ capture systems. In the case of post-firing $CO_2$ capture (capture from flue gases after combustion in air), the particulate heavily interferes, for example with molecules (amines) that are active agents in the $CO_2$ capture. This reduces the process efficiency and thus increases both the investments requested and the parasitic consumption of the produced total power. In case of the developing technologies that modify the combustion process, for example by switching from air to oxygen to obtain concentrated $CO_2$ in the fumes, the presence of the particulate requires special and expensive fume cleaning operations, so to make then available a $CO_2$ gas that can be fed to high efficiency compression rotary machines, without accumulation in the downstream systems conveying and reintroducing $CO_2$ under the ground. The comparison between CAPEX (capital expenditure) and OPEX (operation expenditure) of a simple $CO_2$ compression, with the relevant cost estimates of the industrial development plans that are under way (ex. Futuregen 1 and 2 in USA), and that must therefore include fumes cleaning, is quite evident.

Therefore recent evidences point to the effects both on the human health and on the environment of the submicron particulate, produced by the combustion plants with conventional technologies, and on the cost factors of the developing technologies with $CO_2$ capture for reducing the greenhouse effect (target: integral impact reduced on the environment).

In consideration of the limits of the conventional technologies of fume cleaning, it was therefore felt the widespread need to intervene at the beginning on the combustion process itself, in order to avoid the formation and emission with combustion fumes of ultrafine (submicron) particulate.

As said above, the particulate is formed both of incombusted or partially combusted particles (organic particulate), and of inorganic particles (in particular metals).

In the prior art on combustion the concentration of the emitted particulate is generally expressed by weight (integral of the particle size weight distribution up to 10 μm, or up to 2.5 μm) referred to the volume unit of produced or emitted fumes. The weight integral value of the particle size distribution by unit volume of the fumes, below 1 μm particle size is not taken into consideration. And, even less, there is not even an indirect mention to the submicron numeral distribution of the ash particles in fumes. Some patents concerning combustion can for example be mentioned.

EP 1,616,129 in the name of the Applicant relates to a flameless combustion process to treat materials of various kind, for example waste, wherein the formation of cold zones in the reactor is reduced, the process being carried out under isothermal or quasi isothermal conditions, operating at temperatures higher than 1,300K and under pressures higher than the atmospheric one, the oxidant being fed in admixture with water, steam or recycling gas. In the patent it is stated that the combustion fumes contain very low TOC (Total Organic Carbon) amounts, of the order of ppm, as well as amounts of the same order of magnitude of fly ashes.

This patent does not give any indication on the numeral distribution of the particles in fumes.

U.S. Pat. No. 8,453,583 describes a combustion process using liquid, solid and gaseous fuels at temperatures in the range 1,300K and 2,500K, the comburent being oxygen, the combustion being carried out under "opaque" and infrared radiation, preferably under pressure and diluting oxygen with recycling fumes, and by adding to the inletting fuel of water/steam.

The combustion is exhaustive and produces fumes that do not contain organic particulate: TOC <1 ppm and soot not detectable. At the analysis carbon is below the sensitivity limits (<0.01% by weight). Also residual ashes in fumes, collected on a filter and screened with a release test in water, give negligible concentration values of incombusted products, near the analytical sensitivity limit (<0.01% by weight).

This patent does not give any indication on the submicron weight distribution of the ash particles in fumes and neither on the submicron numeral distribution, and even less on the distribution at particle diameters lower than 0.1 micrometer.

According to the teaching of these two patents, the incoming ashes are melted, coalesce in the melted state and are separated from fumes by collapsing on the refractored walls of the combustor. However, although the quantitative efficiency of the separation is high (>99%), the characterization of the fumes outletting the combustor carried out with a continuous process ELPI® type analyzer, that is an impactor collecting data on the weight and numeral distribution of the population of particles (inorganic particles in case of this teaching) with respect to their diameters, points out that the residual particle distribution is centered at values just above the micrometer (1-3 μm), the upper limit being above 7-8 μm, the distribution being open towards values lower than one micrometer.

As said, in terms of amounts by weight, the efficiency of the separation in the combustor is high, and the residual particle amount in fumes, determined by the techniques available for the evaluation of the PM 10 limit at chimney, is quite below this limit, even up to 1/10 with respect to the limit (EPA Method 201A—Determination of PM10 and PM 2.5 Emissions from Stationary Sources).

It has been found by the Applicant that the fraction of submicron population in fumes is almost unaffected in the processes described in these two patents.

EP 2,220,198 describes a combustion process using a flameless and isothermal combustor to which compounds having a melting temperature lower than or equal to 1450K are added. In this way in fumes the concentrations by weight of the particles having a diameter lower than 2.5 μm (PM 2.5) are reduced to values of about 10 μg/Nm³.

Also this patent does not give any indication on the numeral distribution of the particles, lower than 1 μm in fumes.

EP 2,227,521 relates to a combustion process in a flameless and isothermal combustor wherein compounds having a melting temperature lower than or equal to 1450K and sulphur, or sulphur-containing compounds, are used as additives. In the combustion fumes, at the same time of PM 2.5, also basic ashes are reduced, the latter being transformed into compounds that are no longer aggressive towards the walls of the combustor and for the downstream thermal recovery equipments.

Also this patent does not give any indication on the numeral distribution of the particles in fumes outletting the combustor.

However, the experimentally detected typology of the particle size numeral distribution (more significant than that by weight) obtained by the ELPI® analyzer, as said above, does not substantially change its typical characteristic profile.

EP 2,227,523 relates to a combustion process carried out in an isothermal and flameless combustor, wherein as additives sulphur or sulphur-containing compounds are used. In this way the outletting combustion fumes are no longer aggressive for those parts of the equipments that come into contact with the fumes.

Also in this patent there is no indication as to the submicron particle size numeral distribution of ashes in fumes.

The need was therefore felt to have available a process that, while maintaining the performances of the above described combustion processes, would allow a significant reduction of the portion of the particle size numeral distribution of fuel inorganic ashes below 1 μm for at least of about one half, up to about 6-8 times less that initial, and reaching a particle size numeral distribution close to that of the natural background, with clear advantages for human health, for 002 capture processes and with an increased efficiency of the plants used for fume cleaning, combined with a substantial elimination of the organic particulate (incombusted products) in fumes.

DETAILED DESCRIPTION

It is an object of the present invention an oxycombustion process wherein a combustor is fed with a fuel, a comburent and compounds under the form of coherent aggregates having the following feature cohesive forces such as to give a Young modulus value $\geq 10^4$ MPa a particle size higher than 75 μm for at least 60% by weight of their granulometric distribution, the aggregates having the above properties at the inlet into the combustor, the amount of aggregates with respect to the fuel ashes ranging from ≥5% by weight up to at most 1:1 by weight, the combustor being isothermal and flameless.

The combustor preferably operates at temperatures comprised between 1,400 K and 2,200 K, still more preferably 1,500 K-1,800 K.

The combustor is preferably operated under pressure.

The pressures that can be used in the combustor range from 103 kPa to about 6,000 kPa, preferably from 200 kPa to 4,600 kPa, still more preferably from 500 kPa to 3,000 kPa.

Fuel ashes are determined after exhaust at 600° C., as described for example in ASTM D3174.

The comburent is oxygen, used in admixture with water, steam or in admixture with recycling fumes, preferably with the latter, more preferably the recycling fumes are taken from the fumes outletting the energy recovery equipments.

The ratio by moles oxygen:(water/steam) is preferably comprised between about 1:0.4 and about 1:3.

When recycling fumes in admixture with oxygen are used, the amount of water/steam in fumes is higher than 30% by volume. Optionally, water can be added to the recycling fumes. The molar ratio oxygen:(water/steam) in fumes is as defined above.

The oxygen used in the process of the invention is pure oxygen or also technical oxygen, i.e. an oxygen titre higher than 80% by volume can be used.

Technical oxygen (titre >80% vol.) is obtained by cryogenic distillation from air or by differential absorption on zeolites, or by separation with ceramic membranes at high temperature, etc. Technical oxygen is commercially available.

In the oxycombustion process of the invention high purity technical oxygen (>98.5% by volume) can also be used. Generally also oxygen having titre 92-94% VSA (vacuum swing absorption) and 88-92% VPSA (vacuum pressure swing absorption) can be used. The lowest limit of the oxygen titre, as said, is about 80% by volume, the complement to 100 being formed of inert gases and/or nitrogen. The comburent in the process of the invention is generally used in excess with respect to the stoichiometric amount. Values from 1% to 3% molar of oxygen (i.e. not converted oxygen), are preferably present in the fumes.

By fuels mixtures containing at least one species oxidizable with oxygen and producing heat development, are meant.

The fuel is fed in admixture with water or steam, the amount of water/steam being equal to at least 30% by weight on the fuel.

In the mixture with fuel the water/steam amount is not higher than 90%, preferably not higher than 80% by weight with respect to the fuel weight. Amounts of added water above 90% by weight can significantly lower the thermal recovery efficiency.

The fuels that can be used are liquid, solid, gaseous fuels.

Among solid fuels, hydrocarbon solids, brought to melting/liquefaction by heating, and fed as viscous liquids, can be used.

Solid fuels can also be gasified and the obtained crude gases fed to the combustor of the invention. As fuels usable in the process of the invention biomasses, for example deriving from sugars, animal flours, coal, industrial wastes from neutralization reactions, high-boiling refinery fractions, bitumens and oil shales, processing wastes of tar sands, peats, exhausted solvents, pitches, in general industrial process scraps and waste, including the residual fraction of urban waste, optionally comprising CDR (fuel from waste), can be mentioned. Emulsions of liquid fuels of oil origin can also be used.

As gaseous fuels, $CH_4$, low molecular weight hydrocarbons (for example ethane, propane, butane), syngas can also be used.

The granulometry particle size distribution of the aggregates is determined for example by ASTM C136-06.

The aggregate particle size preferably is not higher than about 900 µm, preferably lower than or equal to 700 µm still more preferably lower than or equal to 500 µm, most preferably lower than 300 µm.

The upper limit of the Young modulus of the aggregates can be about $10^6$ MPa.

Preferably the fed amount of aggregates is ≥10% more preferably ≥20% by weight with respect to the fuel ashes.

The aggregates are fed to the combustor separately from the fuel or in admixture therewith.

The aggregates according to the present invention have a high cohesion force, as shown by the Young modulus values. Therefore the aggregates are coherent materials. The aggregates of the invention do not comprise powders or incoherent materials not showing values of the Young modulus comprised between the above indicated limits.

The Applicant has unexpectedly and surprisingly found that if the fuel contains already aggregates having a Young modulus within the above indicated limits and the relevant amounts by weight with respect to the fuel ashes are equal to or higher than the lower limit reported above, it is not necessary to add to the fuel the aggregates of the invention. However the Applicant has found that from the industrial point of view it is preferable to add the aggregates according to the present invention in the above reported amounts as the fed fuels are often intrinsically unhomogeneous (unreproduceable) as regards to the aggregates contained in the fuel.

The aggregates usable according to the present invention are minerals having the above mentioned characteristics (Young modulus, granulometric distribution). Silica, silicates, silicoaluminates, calcium oxides, aluminum oxides, alkaline phosphates, etc. can for example be mentioned.

In the oxycombustion process of the present invention bentonite is preferably excluded among the usable aggregates.

The aggregates that are preferably used are vitreous slags coming from the combustion process of the present invention, separated at the bottom of the combustor. Generally these slags are separated under the form of vitreous beads having sizes of some millimeters, for example 2-3 mm, and subjected to a milling step to obtain the above indicated granulometry for use in the process of the present invention.

Slags obtained from other combustion processes can also be used provided that they show the above mentioned characteristics of the aggregates of the invention.

The amount of aggregates that can be already contained in fuel ashes can be determined by XRF rays diffractometry (X ray fluorescence) and the obtained data are processed with CQPA (Chemical Quantitative Phase Analysis) techniques in order to determine the corresponding minerals (Pittsburgh Coal Conference, September 2013, Proceedings, Zdenek Klika, I. Kolomaznik "Critical Evaluation of Mineral Contents in Coal using Chemical Quantitative Phase Analysis Method").

In case the values of the Young modulus of the materials or of the minerals under screening are not immediately available, as a qualitative indicator of the cohesive forces of the aggregate the hardness Mohs scale, well known in mineralogy, can be used. Hardness values higher than 3 in this scale indicate that the Young modulus is comprised in the above reported limits.

Aggregates having an hardness higher than 3 can therefore be used in the process of the present invention.

It has been surprisingly and unexpectedly found by the Applicant that materials that after calcinations show a Mohs hardness value higher than 3 can be used as aggregates to be fed to the combustor of the invention, even though the starting material has a lower Mohs hardness, for example comprised between 2 and 3 Mohs. Calcination is preferably carried out at temperatures higher than 1,100 K. The materials having a hardness comprised between 2 and 3 Mohs are subjected to calcination before the addition to the combustor. Alternatively, calcination can also be carried out directly in the combustor.

In the process of the invention as optional components also low-melting compounds, preferably under the form of low-melting salts and/or low-melting oxides, and mixtures thereof, having a melting temperature lower than 1.450 K, preferably higher than 800 K, in an amount expressed as % by weight on the fuel ashes fed from zero, preferably from about ≥5% up to about ≤10%, can be added. Tests carried out by the Applicant have shown that if these low-melting compounds are used in amounts higher than the above limit, in the fumes there is an increase of the integral of the numeral distribution of the submicron inorganic particle size.

As said, the combustor of the invention is isothermal when the internal temperature of the reactor is almost uniform in the whole volume of the reactor. According to the present invention within the meaning of the isothermal combustor the quasi isothermal reactor is comprised, according to the present invention the temperature in all the zones of the quasi isothermal combustor ranges at the most±5% with respect to the base (mean) combustion temperature. This means that practically in the combustor there are not significantly colder zones.

As said, the combustor of the invention is flameless i.e. the combustion process takes place in the whole combustor volume without formation of a flame front.

As an example of isothermal reactor see EP 1,616,129. As an example of flameless reactor see U.S. Pat. No. 8,453,583 in the name of the Applicant, herein incorporated by reference.

In the process of the invention the residence time of the fuel in the combustor preferably ranges from 0.5 seconds up to 30 minutes, more preferably from 2 to 10 seconds. It is possible to use also longer times, if desired.

Next to the combustor bottom, there is connected a collection vessel of the melted ashes that fall at the liquid state in the lower part of the combustor. In the collection vessel ashes are cooled, for example by using a water bath, and transferred in a solid vitrified state into static settlers.

When the fumes obtained in the combustion process of the invention are used to produce energy by means of steam or heat for other applications, at the outlet of the combustor the hot fumes are cooled by mixing them with cold recycling fumes (recycled after thermal recovery), in a ratio hot fumes/cold fumes such that the final temperature of the gaseous mixture is about 1,100 K. The temperature decrease thus obtained, by strict recycle of the fumes outletting the thermal recovery, takes places without enthalpy penalizations of the cycle (isoenthalpic operation), and it has no impact on the thermal energy of the produced steam, as the SH (superheated) steam temperature technological maximum acceptable by the turbines is 903 K. The above temperature decrease does not therefore imply any penalization of the transformation cycle yields from thermal energy into mechanical/electric energy, and allows instead to gain the net advantage of using equipments for thermal recovery by wall heat exchange between fumes and water/steam, built with materials of general use for the same operation in conventional power plants.

The combustor is preferably refractored. The refractories used in the combustor of the invention are according to the prior art preferably aluminous with addition of about 10% of chromium and optionally also about 4% zirconium.

The fumes net gaseous product of the combustion can be removed from the relevant pressurized circuit by lamination to atmospheric pressure. When it is desired to recover $CO_2$ from fumes and the fumes have a content of water/steam <50% by volume, a preferred solution is to operate neutralization (washing) step under pressure.

The process of the present invention allows to substantially eliminate from fumes the organic particulate (incombusted) and drastically reduce the integral of the particle size numeral distribution of the inorganic compounds having particle size below 1 μm. The process of the present invention allows furthermore to reduce and simplify the unit operations for fume the post-treatment, as indicated above.

Further, in the combustor of the present invention in the preferred temperature range, and for a suitable residence time, preferably ≥2 sec, the formed chemical species melt together with the incombustible ashes contained in the fuel (oxide mixtures) and are subjected to liquid coalescence to the point to collapse as drops on the combustor walls, and collect in a substantially quantitative way (>99% with respect to the ash balance) at the bottom of the combustor.

In the present invention it has been found that soot is absent as pointed out by both the carbon and SEM analysis. By soot it is meant a combustible organic material in the form of aggregates having sizes from about 10 nm up to about 10 μm, more specifically of organic macromolecules having a composition significantly rich in oxygen besides in carbon and hydrogen (hydrocarbon macromolecules partially degraded by oxidation reactions), residual in fumes due to their incomplete combustion.

In the process of the invention it is also obtained the effect of the compression of the portion of the distribution on the left of the central peak of the weight distribution, set around at a value of 2-4 μm of the particle diameter in a plot weight (ponderal) particle size distribution/logarithm particle size.

At a quantitative level, by using the ELPI® analyzer, it is found that the submicron particle fraction in the fumes is reduced from values around 0.1 mg/Nm³, obtainable according to the above indicated prior art teachings, down to values of 0.01 mg/Nm³ with the invention process.

In the process of the invention an optionally present particulate portion having particle size above 2-3 μm, outletting the combustor, can be easily removed from fumes by the known and competitive methods (cyclones, filters, dry and wet electrostatic filters, wet scrubbing, etc.), while the submicron portion, critical for the post-combustion separation processes from fumes, is not formed (by-produced), or its formation is strongly reduced directly in the combustion.

The results obtained by the Applicant with the present invention are quite surprising and unexpected in view of the prior art on combustors, as the problem of the reduction of the integral of the numeral distribution of the submicron particles, that are so harmful to human health as reported above, has never been taken into consideration and/or solved. Therefore in the prior art there was no indication on how to solve this problem.

The same problem is relevant also for the $CO_2$ recovery and storage, as it is important that the fumes do not contain a high number of submicron particles (see above).

It is known in the consolidated combustor prior art that fuels of various kinds, gases liquid and solids that can contain incombustible particles, called ashes, can be used. These ash particles contained in the fuel will be called hereinafter "primary ashes".

The primary ashes have two outcomes in the combustor: for a small part (3-5% of the inletting ashes) bind to the particles of partially combusted/incombusted fuel (soot), to give heavy ashes that separate from fumes in the combustor (and also as fouls on the surfaces of the downstream energy recovery equipments), while for a remarkable part (>95%) they come out from the combustor together with fumes as fly ashes. The primary ashes are formed of particles having a very uneven surface and a quite random shape. They can however be dimensionally represented by an "equivalent sphere", the diameter, surface and the volume of which can be defined.

Primary ashes have a very large diameter distribution, ranging from 0.01 μm to hundreds of micrometers, the diameter being determined by the aid of electronic microscope characterization of the ashes contained in commercial fuels.

The deriving/residual ashes from fuel combustion are those subjected to the thermal treatment, or optionally chemical treatment in the combustion and are likely to be different from those inletting and are called "secondary ashes".

Disregarding the small portion going to heavy ashes, the secondary ashes substantially constitute the fly ashes and maintain the very large weight distribution of their fractions as a function of the particle diameter, of the primary ashes.

The unit operations for ash separation are very efficient (100%) on particles having a diameter >60-80 μm. The efficiency weakly decreases as the diameter decreases, down to a sudden quick drop in efficiency <5% in the particle diameter range between 1 and 10 μm.

It is thus obtained, after fume post treatment with the consolidated industrial technologies, a diameter distribution (plotting in ordinates the weight distribution and in abscissas the logarithm of the diameter, see the Figures) interrupted on the right for the part >10 μm, and only reduced in the range between a few micrometers and 10 μm.

More strict separations by means of electrostatic separators and followed by wet electrostatic separators are effective only in the particle diameter range from 1 to 10 μm and very little below 1 μm.

The numeral distribution with particle size below 1 μm, and in particular below 0.1 μm, is not significantly modified; in effect the weight value PM 10 of fly ashes (or the weight of all the particles having a diameter lower than 10 μm Nm³, (see the method indicated above) is different from the PM 2.5 value (particles having a diameter lower than 2.5 m), as the latter discriminates the particle size in correspondence of the efficiency loss of the conventional post-treatment separation technologies. In the consolidated combustion technologies the fly ash particles are both organic (soot, partially combusted fuel) and inorganic (oxides and metal salts, incombusted) resulting from fly ashes entering with the fuel.

The results obtainable with the teachings of the above mentioned patents are descriptively different.

Advanced methods are available for the sampling and characterization of soot. Sampling is carried out by the Andersen probe, followed by filtration on silicate fiber panels having 0.1 µm cut-off, followed by condensation and by the partial but representative recovery of the fraction having a diameter in the range 0.01-0.1 µm. Soot characterization is carried out by electronic microscope (SEM) combined with spectroscopy techniques EDX, and utilizes both the strong morphological difference (cenospheres and plerospheres) of soot particles with respect to inorganic ashes, and the results given by the carbon X spectrum.

The fume particle characterization carried out by means of the above described techniques shows that the teaching of U.S. Pat. No. 8,453,583 gives as a result the disappearance (not detectable) from the collected fly ashes of the particle structures typical of soot (Black Carbon, Organic Carbon).

There are methods of characterization of powders allowing the determination of the total carbon (as a sum of elemental carbon and of the carbon of any present organic compound), at least down to the lowest limit of the concentration by weight of 0.01%.

The analyses of the residual carbon in fly ashes obtained according to the teaching of U.S. Pat. No. 8,453,583, show that it is lower than 0.01% by weight, confirming the results obtained with the electronic microscope with the above indicated morphological characterization method.

For the inorganic ashes, salts and metal oxides, the combustion process according to the teaching of U.S. Pat. No. 8,453,583 allows to retain in the combustor, by melting coalescence and separation from the fumes, a high percentage of the ashes entering with the fuel, >99% by weight with respect to the total incoming ashes.

As to heavy metals, oxides and salts that coalesce with the mass of melted ashes on the combustor walls a shift in the distribution between fumes and ashes melted towards melted ashes, is obtained.

However, although the quantitative effect is considerable, the analysis of the numeral distribution of the particle size obtained by the ELPI® impactor shows that the population of the particulate below 1 µm (the submicron particulate, not removable with the consolidated industrial techniques) remains high.

For example, from the data relevant to the twelve ELPI® (see below) impact targets on the fumes outletting the combustor according to the present invention, processed by ELPI®, the diagrams reported in the Figures attached to the present invention are drawn.

For a better understanding of the results of the present invention it is worthwhile comparing the results with the reference examples carried out by the Applicant in order to evidence the surprising and unexpected results of the present invention. In practice, considering also the examples reported below, it has to be taken into account that the reference examples are (internal) comparative examples carried out by the Applicant to show the advantages obtained with the present invention also with respect to the prior art wherein no mention was anyway made of the technical problem of the present invention.

In reference example 1, carried out according to the teachings of U.S. Pat. No. 8,453,583, although high yields of ashes retained in the combustor under the form of melted slags are obtained, the left portion of the numeral distribution (submicron), of the particle size shows a curved shape (FIG. 3) not different from that obtained in conventional combustion processes. In particular, the large particle population on the left of 1 µm. For a comparison it should be considered in the "natural background" the integral of the numeral distribution of the micro powders for the population having a diameter in the range 0.007-0.1 µm is comprised between 3,000 and 20,000 particles/cm$^3$), is in practice unchanged. As already said, the teachings of the prior art have an effect on the weight amount of ashes in fumes but they do not work (are not effective) for reducing the part on the left of the numeral distribution of the particle size, as evidenced by the numeral distribution of the submicron particles.

Example 2 is carried out under the same conditions as Example 1 but by adding to the combustor the low-melting salt potassium sulphate.

The reduction of the concentration by weight is significant. Most of the heavy metals separate from fumes and preferably collect in liquid slags recovered at the bottom of the combustor.

The numeral population (FIG. 5) between 0.1 and 1 µm particle size however remains still very rich.

According to a not binding interpretation from the Applicant, when to a combustor a low-melting compound is added with the fuel, a widening of the zone of the combustor active for the particle coalescence is obtained and this brings to a reduction of the theoretically active concentration of each individual of the particle population, but only up to a limit above which the low-melting compound that has a higher vapour pressure reforms secondary particles, that is submicron individuals of the particle population, at the outlet of the combustor during the step of fume cooling.

In fact there is experimental evidence on the tendency of the vapours of inorganic species (oxides and salts) to give oversaturation phenomena in the vapour molecular state. Therefore these vapours come out from the combustor with fumes, in particular in case of water soluble chemical species, fed to the combustor in aqueous solution (i.e. fed to the combustor at the molecular state).

Tests carried out on a 3 MW thermal (MWth) power pilot combustor show the absence of coalescence and of separation/precipitation into the combustor of liquid slags of water soluble oxides and salts having melting temperatures comprised between 600 and 1200 K fed in aqueous solution. As a further example, some tests on the same 3 MWth unit combustor, carried out with auxiliary fuel and sodium chloride salt (Tm 830° C.) fed in aqueous solution together with sulphites to generate $SO_2$ in the reaction environment and to quantitatively transform chloride into sulphate (Tm 850° C.), have invariably produced fumes having a powder content of the order of dozens of g/Nm$^3$ fume dry basis, that is, all the inletting material is in the outletting fumes.

This phenomenon is illustrated in reference example 3 that shows in support of the above explained interpretation, and within the already said limitations, the effect of the progressive shifting of the residual ash composition from values very near those of the ashes inletting into the combustor, to compositions enriched in the added low-melting compounds well further to the stoichiometric (ashes+low-melting compounds).

It has been surprisingly and unexpectedly found that in the process of the invention the pressure applied into the combustor can influence the reduction of the integral of the numeral distribution of the submicron particle population, although the very large supersaturation of the fumes by salts and metal oxides would discourage to follow this path.

Example 4 was carried out under the conditions of reference example 1 but by using a pressure of 12 barg (13 absolute bar) by adding the aggregates according to the invention (in this case the aggregates are those contained in ashes). The reduction of the ash weight concentration in fumes is even more significant. The numeral distribution diagram (FIG. 7) is obtained without correction for the losses of fines. After correction, in the numeral diagram the particle fractions between 0.01 and 0.1 micrometers (about 100,000 and 150,000 l/cm$^3$, respectively), rise again, without however showing the trend described in reference example 1. A trend with a maximum is in fact not excluded, as this is constantly present with the variation of the ash composition in the fed fuel.

Figure 7:
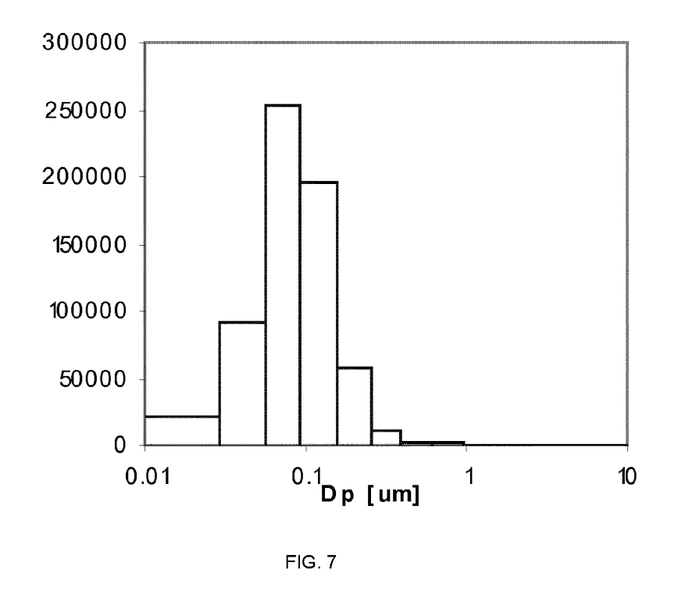
FIG. 7 shows a diagram representing the number distribution vs. diameter of particles in the combustion fumes obtained by a combustion process carried out according to an embodiment of the present invention.

In the weight distribution/logarithm particle size diagram it is noted that the amount of the particle population having a diameter comprised between 0.1 and 1 μm significantly decreases, but it remains still remarkable.

As already said, the Applicant has surprisingly and unexpectedly found that by adding or "seeding" the fuel, separately or in admixture, with the aggregates according to the present invention, i.e. Young modulus >10$^4$ MPa, a reduction of the submicron particles is obtained such that the peak value of the integral of the numeral distribution does not exceed 100,000-150,000 particles/cm$^3$ fume dry basis.

Figure 8:
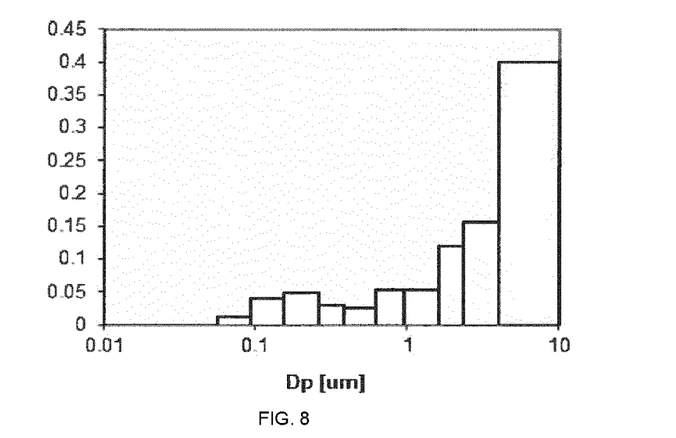
FIG. 8 shows a diagram representing the weight distribution vs. diameter of particles in the combustion fumes obtained by a combustion process carried out according to an embodiment of the present invention.
Figure 9:
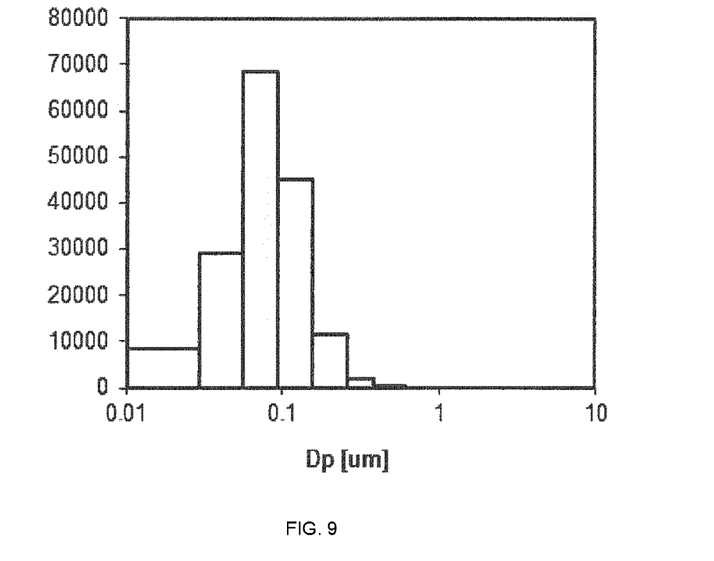
FIG. 9 shows a diagram representing the number distribution vs. diameter of particles in the combustion fumes obtained by a combustion process carried out according to an embodiment of the present invention.

In example 5, by applying a pressure of 12 barg, and by adding to the fuel as % by weight with respect to the ashes produced by the combustor of the invention, 0.6% of vitrified slags coarsely milled with a roll mill (particle diameter >75 μm for 60% of particles, maximum diameter <600 m), the weight distribution diagram (FIG. 8) and numeral distribution diagram (FIG. 9) are obtained. The diagram of FIG. 9 shows that the integral of the numeral distribution of the particles in fumes obtained in this example is almost not so far from that of the natural background and besides the particles are predominantly formed of alkaline-earth metals and silico aluminates, therefore also the particle composition is close to the powders of the natural background.

According to an interpretation of the Applicant, even if not binding and not limitative of the invention, it is assumed that in the combustor the slow phase of the liquids/vapours coalescence be the Brownian phase.

It is known that the Brownian diffusion parameter D has two intervals with two different trends, said two intervals being distinguished by:

$$Dp >> \lambda$$

$$Dp << \lambda$$

Dp being the diameter of the hypothetical particle under examination and λ the free mean path of the particle according to the Knudsen equation, $$Kn = \lambda/Dp.$$

When $Dp >> \lambda$ the Brownian diffusion parameter D is a function of 1/Dp that is, as the number of nuclei is a function f(D), the mass involved in the coalescence phenomena is a function f(Dp$^2$). When $Dp << \lambda$, D is a 1/Dp$^2$ function, and the mass is a function f(Dp).

In other words, when $Dp >> \lambda$, the phenomena are fast, with capture through surface, that is the relatively largest particles act as scavengers of the small molecules.

When $Dp << \lambda$, particle size growing phenomena are slow.

This would explain also the remarkable supersaturation phenomena, depending on the fume residence times in the combustor (a few seconds).

From the Knudsen theory, the parameter A of Stokes decreases as the pressure increases.

The pressure does not therefore act on the coalescence phenomena for $Dp << \lambda$, but actually widens the region of particles having size Dp wherein the coalescence phenomena are fast.

The seeding with ashes having a Young modulus in the above reported limits introduces nuclei (the invention aggregates) having already $Dp >> \lambda$, and acts in the same way.

As said, the aggregates of the invention can be obtained from structurally fragile oxides and salts, having a Young modulus in the above mentioned limits, milled with the usual techniques so as to obtain the above indicated granulometry, said aggregates under the conditions of the combustor of the invention are fractured (broken) by thermal expansion, very intense and repeated, due to the combined effect of the temperature and of their intrinsic fragility as shown by the elastic modulus values. The addition of vitreous slags produced at the bottom of the combustor is preferred, as it is very efficient (low addition concentrations), and as they do not increase (they close the balance on the inletting ashes) the amount of the produced vitreous slags to be disposed of.

In this way it is possible to obtain the effects of the low-melting additives, that is a widening of the combustor volume involving particles in the liquid state that can coalescence without the negative effects of vapour/small liquid particle increase.

As already said, oxides/salts/intrinsically fragile granules can already be present in the fuel.

In the case of fossil fuels, biomasses, waste containing an appreciable inert filler, a thorough characterization to determine the mineralogical properties of the ashes present in the fuel allows to establish the amount aggregates to be added.

The obtained results on the reduction of the integral of the numeral distribution of the inorganic particle size are independent from the chemical composition of the ashes of the fuels fed into the combustor (such as for example for the ashes from phosphate-based biomasses), and from the composition (salt or metal oxide) of the aggregates provided that the aggregate has the characteristics as defined according to the present invention.

The process of the invention allows to pilot the melt coalescence phenomenon, on varying the chemical composition of the inletting ashes, and favour the ash retainment into the combustor in several cases of ash compositions, in order to maintain an high efficiency of the ash retainment in the combustor, and to convey in the melted ashes separated at the bottom of the combustor the amount as largest as possible of heavy metals entering with the fuel.

Another object of the present invention are flue gases obtainable with the process of the invention.

More specifically the fumes of the invention are characterized in having a substantial absence of organic fume particulate (TOC total organic carbon), being its residual weight concentration, determined as carbon, lower than 0.01 mg/Nm$^3$ fume dry basis, and the value of the integral of the numeral distribution of the particles having a diameter lower than 1 μm, lower than 650,000, preferably lower than 300,000 and still more preferably lower than 200,000 (1/cm$^3$ i.e. particle number/cm$^3$);

of the particles having sizes lower than 0.1 μm being lower than 400,000, more preferably lower than 200,000 still more preferably lower than 120,000;

when the following test is used: in a thermal 3 MW isothermal and flameless combustor, operating at a pressure of 13 absolute bar (12 relative bar) at the temperature of 1430° C. by feeding coal as fuel and oxygen 90% by volume as comburent, in the fumes outletting the combustor being present oxygen at a concentration 3% by volume, coal being fed as a 35% by weight slurry in water, oxygen being fed in admixture with the recycling fumes containing 55% by volume of steam, and being the integral of the numeral distribution determined with the impactor ELPI®.

The fumes obtainable with the process of the invention showing a value of the integral of the numeral distribution of the inorganic particles having diameter below 0.1 micron of 120,000 in a diagram having in ordinates the particles/cm$^3$ and in abscissae the particle diameter logarithm in are not obtainable by any known process of the prior art.

As said, with the combustion process of the present invention a substantial elimination:
- of the organic particulate of fumes is obtained combined with the reduction to very low weight concentrations, lower than 0.01 mg/Nm$^3$ fume dry basis (determined as carbon),
- of the fraction of inorganic ashes having particle sizes lower than 1 µm, or more correctly, with the reduction of the integral of the numeral distribution of the inorganic particle size (diameter) being it possible to reach a numeral distribution approaching the numeral distribution of inorganic particle size of the natural background.

More preferably the present invention allows to obtain the reduction of the integral of the numeral distribution of the fraction of the inorganic particles having particle sizes below 1 µm to about one half with respect to the numeral distribution below 1 µm obtainable with the reference examples, that are internal comparative tests carried out by the Applicant, being it possible to reach also values about 6-8 times lower, that is to obtain a numeral distribution almost approaching the numeral distribution of the inorganic particle size of the natural background, and with respect to the numeral distribution of particles having a diameter below 0.1 micrometers, and a reduction of 5-6 times less, with respect to the reference examples herein attached.

EXAMPLES

Characterization
Determination of the Fuel Ashes

The determination of the ashes was carried out according to the ASTM D3174 test, or with any pyrolysis method known for this determination carried out at the temperature of about 600° C.

Determination of Heavy Metals

The determination of the heavy metals present in fuels was carried out on the ashes obtained from fuels, by means of plasma techniques, for example ICP-OES.

Determination of the Melting Temperature

The melting temperature was determined according to the ASTM D 1857-87 test.

Determinazione of the Aggregate Granulometry

The determination of the granulometry of the aggregates was carried out by the ASTM C136-06 method.

Determination of the Aggregate Amount in the Fuel Ashes

The determination was carried out by XRF ray diffractometry (X ray fluorescence) and the obtained data were processed with CQPA techniques (Chemical Quantitative Phase Analysis) to reconstruct the mineral component.

Soot Analysis

The analysis was carried out by sampling the fumes by the Andersen probe, followed by filtration on silicate fiber panels having 0.1 µm size cut, then by a condensation step and final recovery of the particle fraction having a 0.01-0.1 µm diameter. The characterization was carried out by electronic microscope (SEM), combined with spectroscopic techniques EDX, and is based on the net morphological difference (cenospheres and plerospheres) (minimum particle diameter detectable by means of the electronic microscope: 10-50 nm) of the soot particles with respect to those of inorganic ashes, and on the carbon X spectrum (sensitivity limit 0.01 o by weight).

Determination of the Young Modulus on the Aggregates

The Young modulus was determined with the ASTM E1876-09 method.

Weight and Numeral Particle Distributions in Fumes

The analysis was carried out by means of the powders continuous analyzer (impactor) ELPI® (Dekati®). The analyzer has 12 channels for classifying powders on the basis of their particle diameter Dp. The method allows to obtain graphs reporting the curves of the typical ponderal and numeral distributions on varying the particle diameter in the range from 0.007 µm up to 10 µm. The fractions above 10 µm are "cut off" by a cyclone operating on the sampled fumes, placed at the inlet of the ELPI® analyzer. The analyzer is provided with 12 channels for the particle size analysis. The central point of each of the 12 channels is herein below reported.

| Ch1 | Ch2 | Ch3 | Ch4 | Ch5 | Ch6 | Ch7 | Ch8 | Ch9 | Ch10 | Ch11 | Ch12 |
|---|---|---|---|---|---|---|---|---|---|---|---|
| 0.01 | 0.03 | 0.06 | 0.09 | 0.15 | 0.26 | 0.38 | 0.61 | 0.95 | 1.60 | 2.39 | 3.99 |

For example the first channel Ch1 has a central point of 0.01 µm, and has a particle cut off from 0.007 to 0.015 m; channel Ch12 has a central value of 3.99 and collect particles up to the upper limit to 10 µm.

The weight and numeral distribution of the particle diameter was obtained by a dedicated software (software ELPI®). Downhill the ELPI® analyzer, in order to have a fine scanning of the smallest particles, from 0.06 to 0.007 µm (0.007 is the lowest sensitivity limit of the particle size of the impactor ELPI®) the instrument DMA (ISAIE) was positioned.

In the graphs hereinafter reported the weight/numeral distribution (ordinates) is plotted against the logarithm of the particle diameter in µm (abscissae). More in detail, in the diagrams the ordinates report the ash concentrations [mg/Nm$^3$] in the case of the weight distribution, the particle number/cm$^3$, [1/cm$^3$] in the case of numeral distribution.

Reference Example A

In this example, a practical representation of the meaning of "natural background" is given. Air of earth atmosphere contains submicron particles as a natural condition. This submicron particle population is commonly referred to as "natural background". Both thereof numeral and the value of the integral of the submicron numeral distribution are affected by the climate conditions and by human activities.

Figure 1:
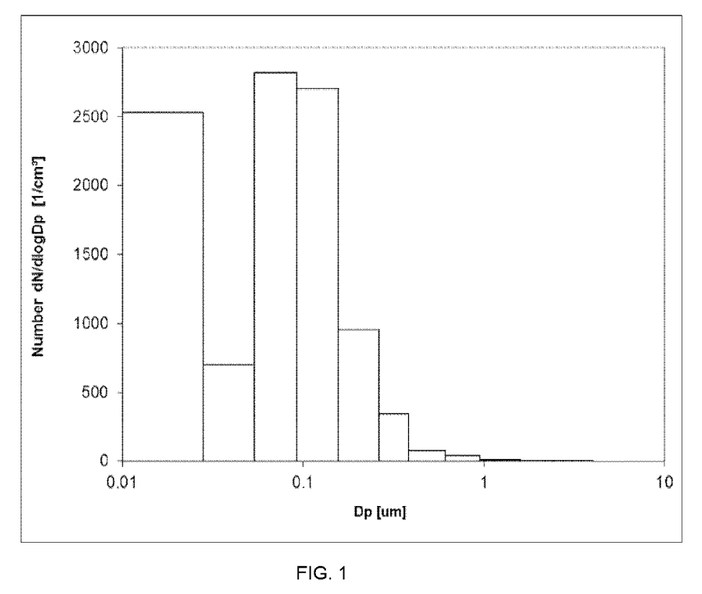
FIG. 1 shows a diagram representing the number particle size distribution of the natural background, determined by using the impactor ELPI®.

FIG. 1 reports a typical diagram of the numeral particle size distribution of the natural background, determined by using the impactor ELPI®. The diagram has not been corrected for the amount of the present smallest particles (fines).

Reference Example 1

The combustion process was carried out according to U.S. Pat. No. 8,453,583 in a pilot plant operated at the thermal power of 3 MWth. Recycling fumes after energy recovery, admixed with oxygen comburent were fed to the combustor. The fumes contained a water amount at a vapor state equal to 55% by volume. The ratio by volume oxygen/recycling fumes was ½. Oxygen was fed in an excess amount such as to have an oxygen percentage in the outletting fumes of about 3% by volume. The combustor was operated under a pressure of 3 barg and at a temperature of 1430° C. Fumes were sampled downstream of the combustor, after tempering with cold recycling fumes. As fuel an Ukrainian anthracite coal (analyses reported in Example 4) was used, wet milled in a bar mill, and pumped with a worm pump as a slurry containing 30-31° by weight of water at the pressure of the fuel injection nozzles of the combustor. The dry pulverized coal flow rate was 400 Kg/h. The sampling of the residual powders in the fumes outletting the combustor showed that a carbon content below the analytical limit (<0.01% by weight), and that soot particles were absent, as evidenced by electronic microscopy.

Figure 2:
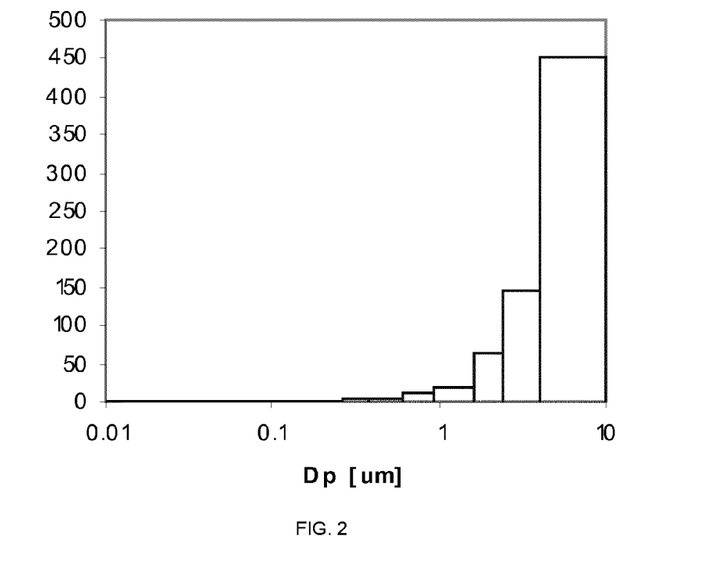
FIG. 2 shows a diagram representing the weight distribution vs. diameter of particles in the combustion fumes obtained by a combustion process carried out according to U.S. Pat. No. 8,453,583.
Figure 3:
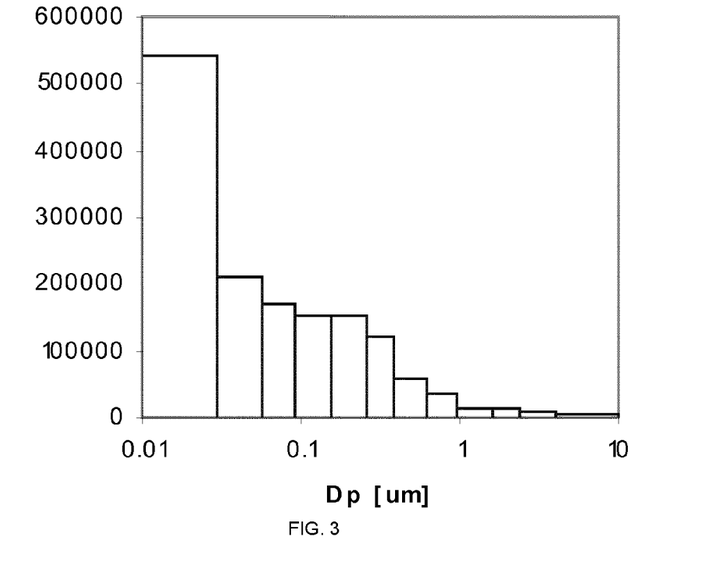
FIG. 3 shows a diagram representing the number distribution vs. diameter of particles in the combustion fumes obtained by a combustion process carried out according to U.S. Pat. No. 8,453,583.

In the sample of the combustion fumes the mean value of the total weight concentration of solids in a sampling period of 20 min was of 304 mg/Nm$^3$ fume dry basis, determined by the impactor ELPI® at the combustor outlet in the same sampling period. The value of the total solid concentration has been in parallel assayed through the batch filtration method of the fumes, Andersen probe and filtration on ceramic fiber collection filters, using the same sampling time. FIGS. 2 and 3 represent, respectively, the weight distribution (concentration mg/Nm$^3$) and numeral distribution (number particles/cm$^3$) of the particles in the combustion fumes.

In the post-treatment of the fumes, filtration on a sleeve filter and then on electrostatic filter, followed by steam condensation, leads to a final value of the particle total concentration <10 mg/Nm$^3$ fume dry basis, that is within the emission limits, due to the removal of the particles having a diameter greater than 2.39 μm (corresponding to channels 11 and 12 of ELPI®) and to the remarkable decrease of the particle population having diameter between 0.95 and 1.6 μm (channels 9 and 10 of ELPI®).

The diagram of FIG. 3 (numeral distribution) shows that the population of particles having a diameter comprised between 1 and 0.01 μm remained substantially unaltered.

Reference Example 2

This example was carried out according to the teachings of EP 2,220,198 Reference example 1 was repeated, but adding the low-melting salt potassium sulphate (melting point 1,340K) in an amount equal to 3% by weight calculated with respect to the fuel ashes. The amount of fuel ashes was about 0.5% with respect to the dried coal weight.

The fume sampling period was of 25 min. In parallel fume sampling also on a ceramic fiber filter was carried out.

The carbon found in the powders of the sampled fumes was below the analytical limit (<0.01% peso) and soot was absent.

The average value of the total weight concentration of the particles in fumes was 8.3 mg/Nm$^3$ fume dry basis, average between point values ranging from 2.3 to 20.8 mg/Nm$^3$ fume dry basis.

Figure 4:
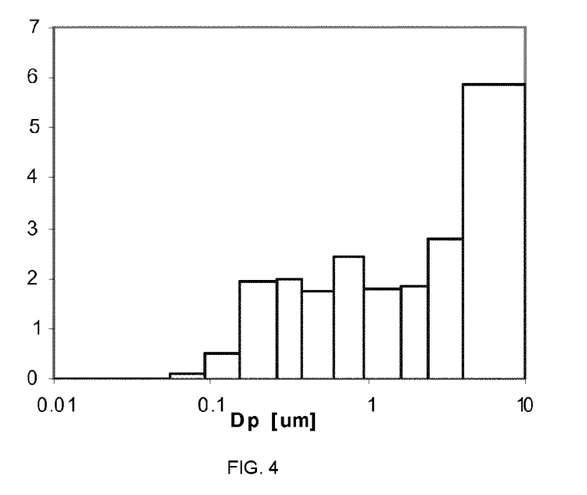
FIG. 4 shows a diagram representing the weight distribution vs. diameter of particles in the combustion fumes obtained by a combustion process carried out according to EP 2220198.

The particle weight distribution diagram of FIG. 4 shows a significant reduction of the particles with respect to FIG. 2 (refer to the ordinate scale). Most of the heavy metals separated from fumes and preferably accumulated into the liquid slags collected at the combustor bottom.

The diagram was obtained without correction for loss of the particles. After correction, in the numeral diagram the fractions between 0.01 and 0.1 rose again, without however showing the trend described in example 1.

Figure 5:
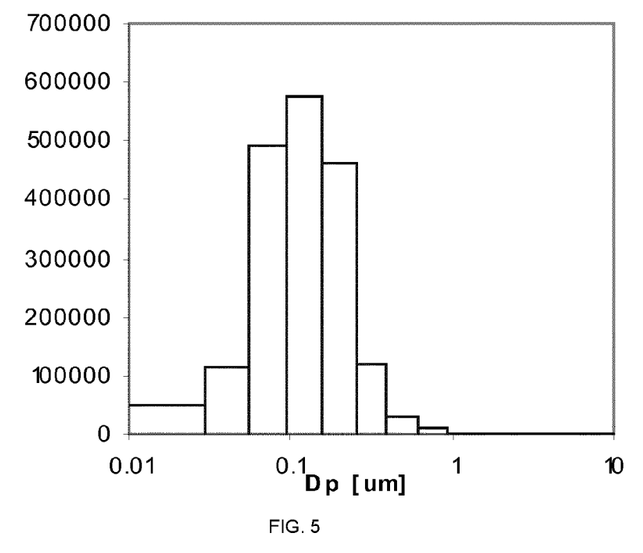
FIG. 5 shows a diagram representing the number distribution vs. diameter of particles in the combustion fumes obtained by a combustion process carried out to U.S. Pat. No. 8,453,583.

The diagram of the numeral distribution of the particle population of FIG. 5 shows that the population of particles having a diameter comprised between 0.1 and 1 μm was still very abundant. The EDX analysis of the fume ashes collected on the ceramic filter evidenced a consistent enrichment of sodium, potassium, magnesium in the ashes outletting the combustor with respect to the inletting composition of coal ashes+additive.

Reference Example 3

The example was carried out by using the same pilot oxycombustion plant of example 1. The pressure was maintained at 3 Barg but the temperature was decreased to 1350° C. The fuel used was diesel oil fed at the flow rate of 245 Kg/h. To the combustor a 23 g/l NaCl aqueous solution wherein sulphur in the form of a wettable powder at the concentration of 12 g/l was formerly dispersed was also fed at a flow rate of 378 l/h.

It was observed that the ELPI® analyzer was quickly saturated/clogged. The obtained values do not appear therefore to be significant.

Likewise, batch sampling on ceramic filter was negatively influenced by clogging of the ceramic filter that took place after a few minutes from the start of sampled fumes flow. A value of powder total concentration of about 30 g/Nm$^3$ fume dry basis was obtained. The thermal exchange in the thermal recovery plant quickly worsened to the point that the test had to be interrupted.

A visual inspection of the combustor, after the test, did not show any evidence of deposits of liquid slags (easily recognizable as white deposits) on the refractored walls.

On the basis of the sodium balance it was possible to establish that the amount of ashes outletting the combustor was substantially equal to that inletting the combustor that is, the fraction retained inside the combustor was negligible.

Considering that the vapour pressure of $Na_2SO_4$ at 1350° C. is equivalent to an amount of the compound of the order of dozen of milligrams/Nm$^3$ fume dry basis, it was concluded that a remarkable supersaturation phenomenon of sodium sulphate vapours took place in the fumes outletting the combustor.

Example 4

Reference example 1 was repeated but that for attemperating the combustor, the recycling fumes were substituted with steam and the pressure of the process was increased to 12 barg.

The fuel used was coal containing an amount by weight of ashes (obtained by calcination) equal to 18%. The ash composition (% by weight) obtained by XRF analysis (X fluorescence) was the following:

| | |
|---|---|
| SiO$_2$ | 58.9 |
| Al$_2$O$_3$ | 22.5 |
| Fe$_2$O$_3$ | 5.4 |
| S (as SO$_3$) | 3.3 |
| CaO | 3.0 |
| K$_2$O | 2.8 |
| MgO | 2.0 |
| TiO$_2$ | 0.7 |
| P$_2$O$_5$ | 0.5 |
| Na$_2$O | 0.5 |

The high content of silica allows to conclude, even without performing CQPA reconstruction of the original minerals, that the ashes contain aggregates having a Mohs hardness higher than 3 in an amount higher than 20% by weight on the total ash amount.

From ELPI® characterization, mediated on a sampling period of 68 min, it was obtained that the mean value of the total concentration of the powders was of 1.06 mg/Nm$^3$ fume dry basis, average between time point values ranging from 0.8 to 1.4 mg/Nm$^3$ fume dry basis. This Figure was in accord with the value obtained from the batch filtration on ceramic filter (on a 68 min of sample collection; prolonged sampling to parallelly allow to collect enough material on ceramic fiber filter).

Figure 6:
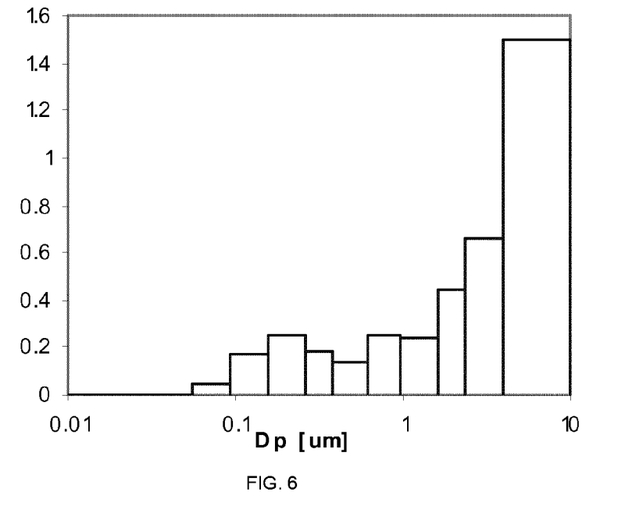
FIG. 6 shows a diagram representing the weight distribution vs. diameter of particles in the combustion fumes obtained by a combustion process carried out according to an embodiment of the present invention.

By comparing the distribution curves obtained in the reference example 2 with those of example 4, it is drawn that, with respect to the weight distribution curve of FIG. 4, that of FIG. 6 is significantly lowered in the range from 0.1 μm and the full scale (10 m).

The diagram was obtained without correction for loss of fines. After correction, the fractions between 0.01 and 0.1 rose again without however showing the trend described in example 1.

In FIG. 7, that represents the numeral distribution, it is observed that the integral of the numeral distribution of the particles having a diameter comprised between 0.1 and 1 μm decreases more than one half with respect to FIG. 5, but it remains still quite high.

Example 5

Reference example 4 was repeated but that to the coal slurry, the following additives were added:
- vitrified slags, collected at the combustor bottom in a previous combustion test. The corresponding amount was equal to 14.8% by weight with respect to that of the coal ashes (about 2.7% by weight with respect to the dried coal),
- the low-melting compound of Example 2, in the same amount reported in Example 2 with respect to the fuel ashes.

The Young modulus of the vitrified slags was about 6×10$^4$ MPa.

The vitreous slags were previously milled in order to obtain a granulometry comprised between 100 and 500 μm for at least 70% by weight of the granulometric distribution.

Slag addition to the coal slurry was carried out in the mixer-homogenizer, upstream the slurry feeding pump to the nozzles of the combustor, at the rate of 10.5 kg/h (as said above, 14.8% by weight with respect to the coal ashes).

The values at chimney of the integral and weight particle distributions (after post-treatment of the fumes) were evaluated. The weight distribution curve is represented in FIG. 8 and the numeral distribution curve in FIG. 9.

A comparison between the weight distribution curves of FIGS. 6 and 7 shows a strong reduction of the total concentration of the particles in the latter.

From the numeral distribution diagram shown in FIG. 9 the integral of the numeral integral up to 1 μm and up to 0.1 μm was obtained. It was calculated that this value was about ⅓ with respect to that corresponding of the diagram of FIG. 7.

It was observed that the value of the integral of the particle numeral distribution was not very far from the natural background of FIG. 1.

The invention claimed is:

1. An oxycombustion process wherein a combustor is fed with a fuel, a comburent, and compounds, the compounds having a form of coherent aggregates and comprising a Young modulus ≥10$^4$ MPa and sizes higher than 75 μm for at least 60% by weight of granulometric distribution,
   wherein the aggregates have the above properties when the aggregates are introduced into the combustor, and
   wherein an amount of aggregates with respect to fuel ashes, which are generated by the combustion process, ranges from ≥5% in % by weight up to at most 1:1 by weight, the combustor being isothermal and flameless.

2. The oxycombustion process according to claim 1 wherein the combustor is operated at temperatures between 1,400K and 2,200K.

3. The oxycombustion process according to claim 1 wherein the combustor is operated under a pressure ranging from 103 kPa to 6,000 kPa.

4. The oxycombustion process according to claim 1 wherein the comburent is oxygen, the oxygen being used in admixture with water or steam and/or in admixtures with recycle fumes.

5. The oxycombustion process according to claim 4 wherein the admixture of oxygen and water or steam has a ratio by moles oxygen:water or oxygen:steam comprised between 1:0.4 and 1:3.

6. The oxycombustion process according to claim 4 wherein the admixture of oxygen and water or steam and/or recycle fumes have an amount of water or steam higher than 30% by volume and have a molar ratio oxygen:water or oxygen:steam comprised between 1:0.4 and 1:3.

7. The oxycombustion process according to claim 1 wherein the fuel is fed into the combustor in admixture with water or steam, the admixture of fuel and water or steam having an amount in percent with respect to the weight of the fuel of at least 30% and not higher than 90%.

8. The oxycombustion process according to claim 1 wherein the fuel is a liquid, solid, and/or gaseous fuel and is selected from the group consisting of hydrocarbon solids, brought to melting/liquefaction by heating, and fed as viscous liquids, biomasses, animal flours, coal, industrial wastes from neutralization reactions, high-boiling refinery fractions, bitumens and oil shales, processing scraps of tar sands, peats, exhausted solvents, pitches, industrial process scraps and waste, emulsions of liquid fuels of oil origin, liquid hydrocarbons, methane, low molecular weight hydrocarbons, and syngas.

9. The oxycombustion process according to claim 1 wherein the aggregates have particle sizes not higher than 900 μm.

10. The oxycombustion process according to claim 1 wherein the Young modulus of the aggregates is not higher than 10$^6$ MPa.

11. The oxycombustion process according to claim 1 wherein the aggregates are fed to the combustor separately from the fuel or in admixture thereof.

12. The oxycombustion process according to claim 1 wherein the aggregates are contained in the fuel.

13. The oxycombustion process according to claim 1 wherein the aggregates are minerals.

14. The oxycombustion process according to claim 1 wherein the aggregates are vitreous slags coming from combustion processes separated at the bottom of the combustor.

15. The oxycombustion process according to claim 1 wherein the aggregates have a hardness higher than 3 according to Mohs scale.

16. The oxycombustion process according to claim 1 wherein the fuel in the combustor has a residence time ranging from 0.5 seconds up to 30 minutes.

17. The oxycombustion process according to claim 1 wherein the combustor is refractored.

18. Flue gases obtainable with the process of claim 1.

19. The flue gases according to claim 18 having:
   a TOC content determined as carbon, lower than 0.01 mg/Nm$^3$ flue gas dry basis; and
   inorganic ashes, whose integral of numerical distribution of particles having sizes <1 μm is lower than 650,000/cm$^3$ and whose integral of numerical distribution of particles having sizes <0.1 μm is lower than 400,000/cm$^3$;
when a following test is used:
   in a thermal 3 MW combustor, operating at a pressure of 13 absolute bar at a temperature of 1430° C. by feeding carbon as fuel and oxygen 90% by volume as comburent, the flue gas having an oxygen concentration equal to 3% by volume, coal being fed as a slurry with water at 35% by weight, and oxygen being fed in admixture with water or steam and with recycle fumes,
   wherein the admixture contains 55% by volume of steam and the integrals of the numeral distribution are determined with an electrical low pressure impactor particle size spectrometer.

* * * * *